US010735125B2

(12) United States Patent
Jones

(10) Patent No.: US 10,735,125 B2
(45) Date of Patent: Aug. 4, 2020

(54) OPTICAL MULTICAST SWITCH WITH BROADCAST CAPABILITY

(71) Applicant: Juniper Networks, Inc., Sunnyvale, CA (US)

(72) Inventor: Kevan Peter Jones, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/721,805

(22) Filed: Sep. 30, 2017

(65) Prior Publication Data
US 2019/0103935 A1 Apr. 4, 2019

(51) Int. Cl.
*H04J 14/02* (2006.01)
*H04L 12/933* (2013.01)
*H04Q 11/00* (2006.01)
*G02B 6/35* (2006.01)

(52) U.S. Cl.
CPC ........ *H04J 14/0212* (2013.01); *G02B 6/3518* (2013.01); *G02B 6/3548* (2013.01); *G02B 6/3556* (2013.01); *G02B 6/3592* (2013.01); *H04J 14/021* (2013.01); *H04J 14/0293* (2013.01); *H04L 49/15* (2013.01); *H04Q 11/0005* (2013.01); *H04Q 2011/0015* (2013.01); *H04Q 2011/0039* (2013.01); *H04Q 2011/0047* (2013.01)

(58) Field of Classification Search
CPC .. H04J 14/0212; H04J 14/0293; H04J 14/021; G02B 6/3556; G02B 6/3592; G02B 6/3518; G02B 6/3548; H04Q 11/0005; H04Q 2011/0039; H04Q 2011/0015; H04Q 2011/0047; H04L 49/15
See application file for complete search history.

(56) References Cited

U.S. PATENT DOCUMENTS 5,905,587 A * 5/1999 Maeno ............... H04Q 11/0001
370/360
6,381,059 B1 * 4/2002 Carlson ................. G02B 26/02
252/582

(Continued)

FOREIGN PATENT DOCUMENTS

EP 2983309 A1 2/2016

OTHER PUBLICATIONS

Extended European Search Report for European Application No. 18192020.8, dated Feb. 26, 2019, 8 pages.

*Primary Examiner* — Leslie C Pascal
(74) *Attorney, Agent, or Firm* — Cooley LLP

(57) ABSTRACT

An apparatus includes a first input port, a first switch, and a second switch. The first switch and the second input port are in optical communication with the first input port. The apparatus also includes a second input port, a third switch, and a fourth switch. The third switch and the fourth switch are in optical communication with the second input port. Each switch is switchable between a first state to pass optical signals and a second state to block optical signals. The apparatus also includes a first combiner in optical communication with the first input port via the first switch and the second input port via the third switch. The apparatus also includes a second combiner in optical communication with the first input port via the second switch and the second input port via the fourth switch.

17 Claims, 9 Drawing Sheets

(56) References Cited

U.S. PATENT DOCUMENTS

| | | | |
|---|---|---|---|
| 6,429,955 B1 * | 8/2002 | Suemura | H04Q 11/0001 |
| | | | 398/48 |
| 8,218,967 B1 | 7/2012 | Stevens | |
| 2006/0093354 A1 | 5/2006 | Beacham et al. | |
| 2013/0259474 A1 * | 10/2013 | Ji | H04J 14/0212 |
| | | | 398/48 |
| 2014/0098828 A1 * | 4/2014 | Nakagawa | H01S 5/0612 |
| | | | 372/20 |

* cited by examiner

OPTICAL MULTICAST SWITCH WITH BROADCAST CAPABILITY

FIELD

One or more embodiments relate to methods and apparatus of optical multicast switching with broadcast capability.

BACKGROUND

A multicast switch (MCS) is a device that combines optical switching and multiplexing to provide a colorless, directionless, and contentionless solution typically used with reconfigurable optical add/drop multiplexers (ROADMs). In a typical M×N MCS structure, where M is the number of input ports and N is the number of output ports, an optical signal can be received by any of the M input ports and delivered at any of the N output ports. In other words, the MCS is fully interconnected.

FIG. 1 shows a schematic of a known multicast switch 100. The multicast switch 100 includes a first 1×2 switch 110 and a second 1×2 switch 120. The first switch 110 can direct an input optical signal to either a first path 115a or a second path 115b, and the second 1×2 switch 120 can direct an input optical signal to either a first path 125a or a second path 125b. The multicast switch 100 also includes a first combiner 130 connected to the paths 115a and 125a and a second combiner 140 connected to the paths 115b and 125b. The first combiner 130 is connected to a first output port 135 and the second combiner 140 is connected to a second output port 145 to deliver output signals.

In operation, the multicast switch 100 can direct an input signal at the first switch 110 to the first output port 135 by directing the input signal to the first path 115a and to the second output port 145 by directing the input signal to the second path 115b. Similarly, the multicast switch 100 can direct an input signal at the second switch 120 to the first output port 135 by directing the input signal to the first path 125a and to the second output port 145 by directing the input signal to the second path 125b.

As can be seen in FIG. 1, the switch 110 can direct an input signal to either the first path 115a or the second path 115b, but not both. This may create several issues in practice. For example, a known MCS architecture is usually based upon a head end switch and a tail end switch, and both switches need to be coordinated for path reconfiguration. In addition, an optical network using known multicast switches at the head end may only implement 1:1 protection scheme, which typically has slower restoration compared to 1+1 protection scheme.

SUMMARY

Some embodiments described herein relate generally to optical multicast switching with broadcast capability, and, in particular, to methods and apparatus for multicast switching reconfigurable between switching and splitting using N 1×1 switches (rather than 1×N switches).

In some embodiments, an apparatus includes a first input port, a first switch, and a second switch. The first switch is in optical communication with the first input port and switchable between a first state to pass optical signals and a second state to block optical signals. The second switch is in optical communication with the first input port and switchable between the first state and the second state. The apparatus also includes a second input port, a third switch, and a fourth switch. The third switch is in optical communication with the second input port and switchable between the first state and the second state. The fourth switch is in optical communication with the second input port and switchable between the first state and the second state. The apparatus also includes a first combiner in optical communication with the first input port via the first switch and the second input port via the third switch. The apparatus also includes a second combiner in optical communication with the first input port via the second switch and the second input port via the fourth switch.

In some embodiments, a method includes receiving a first portion of a first optical signal at a first switch switchable between a first state to pass the first portion and a second state to block the first portion. The method also includes receiving a second portion of the first optical signal at a second switch switchable between the first state and the second state. The method also includes receiving a third portion of a second optical signal at a third switch switchable between the first state and the second state and receiving a fourth portion of the second optical signal at a fourth switch switchable between the first state and the second state. The method also includes combining possible optical signals transmitted through the first switch and the third switch to generate a first output signal and combining possible optical signals transmitted through the second switch and the fourth switch to generate a second output signal.

In some embodiments, an optical network includes a transmitter to send an optical signal and a splitter to split the optical signal into a first portion and a second portion. A first switch is configured to receive the first portion of the optical signal and switchable between a first state to pass the first portion of the optical signal and a second state to block the first portion of the optical signal. A second switch is configured to receive the second portion of the optical signal and switchable between the first state to pass the second portion of the optical signal and the second state to block the second portion of the optical signal. The optical network also includes a receiver, in optical communication with the first switch and the second switch, to receive possible optical signals transmitted from the first switch and the second switch. The optical network also includes a processor operatively coupled to the first switch and the second switch. Upon execution of processor-executable instructions, the processor selects the first switch into the first state to transmit the first portion and selects the second switch into the second state to block the second portion so as to generate a 1:1 protection scheme in the optical network. The processor also selects the first switch into the first state to transmit the first portion and selects the second switch into the first state to transmit the first portion so as to generate a 1+1 protection scheme in the optical network.

BRIEF DESCRIPTION OF THE DRAWINGS

The skilled artisan will understand that the drawings primarily are for illustration purposes and are not intended to limit the scope of the subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
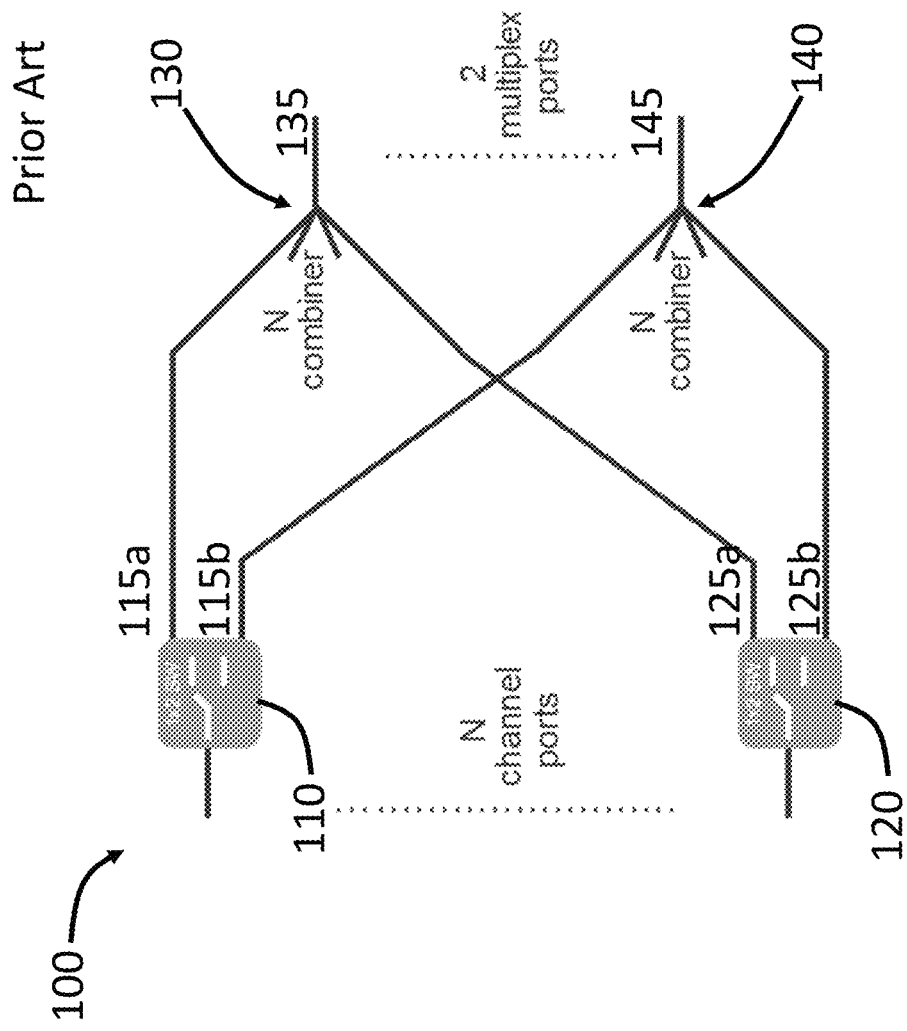
FIG. 1 shows a schematic of a known multicast switch.

In some embodiments, an apparatus includes a first input port, a first switch, and a second switch. The first switch is in optical communication with the first input port and switchable between a first state to pass optical signals and a second state to block optical signals. The second switch is in optical communication with the first input port and switchable between the first state and the second state. The apparatus also includes a second input port, a third switch, and a fourth switch. The third switch is in optical communication with the second input port and switchable between the first state and the second state. The fourth switch is in optical communication with the second input port and switchable between the first state and the second state. The apparatus also includes a first combiner in optical communication with the first input port via the first switch and the second input port via the third switch. The apparatus also includes a second combiner in optical communication with the first input port via the second switch and the second input port via the fourth switch.

In some embodiments, the first switch and the second switch include a variable optical attenuator (VOA) configured to balance power. In some embodiments, each switch can be combined with an additional VOA to achieve independent switching and power balancing functions.

In some embodiments, the apparatus is configured into a switching mode, in which a first input port is configured to pass a first optical signal at a first wavelength. The first switch is selected into the first state to pass the first optical signal to the first combiner and the second switch is selected to the second state to block the first optical signal from the second combiner. The second input port is configured to pass a second optical signal at the first wavelength. The third switch is selected to the second state to block the second optical signal from the first combiner and the fourth switch is selected to the first state to pass the second optical signal to the second combiner.

In some embodiments, the apparatus is configured into a broadcast mode, in which the first input port is configured to pass a first optical signal at a first wavelength. The first switch and the second switch are selected into the first state to pass the first optical signal to the first combiner and the second combiner. The second input port is configured to pass a second optical signal at a second wavelength different from the first wavelength. The third switch and the fourth switch are selected to the first state to pass the second optical signal to the first combiner and the second combiner.

In some embodiments, the apparatus also includes a controller, operatively coupled to the first switch, the second switch, the third switch, and the fourth switch, to control the apparatus between a first operation mode, a second operation mode, and a third operation mode. In the first operation mode, the first switch is configured in the first state, the second switch is configured in the second state, the third switch is configured in the second state, and the fourth switch is configured in the first state. In the second operation mode, the first switch, the second switch, the third switch, and the fourth switch are configured in the first state. In the third operation mode, the first switch, the second switch, the third switch, and the fourth switch are configured in the second state.

In some embodiments, the first combiner is operatively coupled to a first multiplexer and the second combiner is connected to a second multiplexer.

In some embodiments, the apparatus also includes a first splitter and a second splitter. The first splitter is configured to receive a first optical signal having a first spectral component at a first wavelength and a second spectral component at a second wavelength and split the first optical signal into a first portion and a second portion. The second splitter is configured to receive a second optical signal having a third spectral component at the first wavelength and a fourth spectral component at a fourth wavelength and split the second optical signal into a third portion and a fourth portion. A fifth switch is in optical communication with the first splitter and configured in the first state to transmit the first portion of the first optical signal. A sixth switch is in optical communication with the second splitter and configured in the second state to block the first portion of the second optical signal. A first output port is in optical communication with the fifth switch and the sixth switch to transmit the first portion of the first optical signal transmitted through the fifth switch. A seventh switch is in optical communication with the first splitter and configured in the second state to block the second portion of the first optical signal. An eighth switch is in optical communication with the second splitter and configured in the first state to transmit the second portion of the second optical signal. The apparatus also includes a second output port, in optical communication with the seventh switch and the eighth switch, to transmit the second portion of the second optical signal transmitted through the eighth switch.

In some embodiments, the apparatus also includes a first splitter and a second splitter. The first splitter is configured to receive a first optical signal having a first spectral component at a first wavelength and a second spectral component at a second wavelength and split the first optical signal into a first portion and a second portion. The second splitter is configured to receive a second optical signal having a third spectral component at the first wavelength and a fourth spectral component at the second wavelength and split the second optical signal into a third portion and a fourth portion. A fifth switch is in optical communication with the first splitter and configured in the first state to transmit the first portion of the first optical signal. A sixth switch is in optical communication with the second splitter and configured in the second state to block the first portion of the second optical signal. A first output port is in optical communication with the fifth switch and the sixth switch to transmit the first portion of the first optical signal transmitted through the fifth switch. A seventh switch is in optical communication with the first splitter and configured in the first state to transmit the second portion of the first optical signal. An eighth switch is in optical communication with the second splitter and configured in the second state to block the second portion of the second optical signal. The apparatus also includes a second output port, in optical communication with the seventh switch and the eighth switch, to transmit the second portion of the first optical signal transmitted through the seventh switch.

In some embodiments, the apparatus also includes a controller, operatively coupled to the first switch, the second switch, the third switch, and the fourth switch, to select the apparatus between a first operation mode and a second operation mode. In the first operation mode, the first input port is in optical communication with the first combiner and is optically blocked from the second combiner, and the second input port is in optical communication with the second combiner and is optically blocked from the first combiner. In the second operation mode, the first input port is in communication with the first combiner and is optically blocked from the second combiner, and the second input port is in optical communication with the first combiner and is optically blocked from the second combiner.

Figure 2:
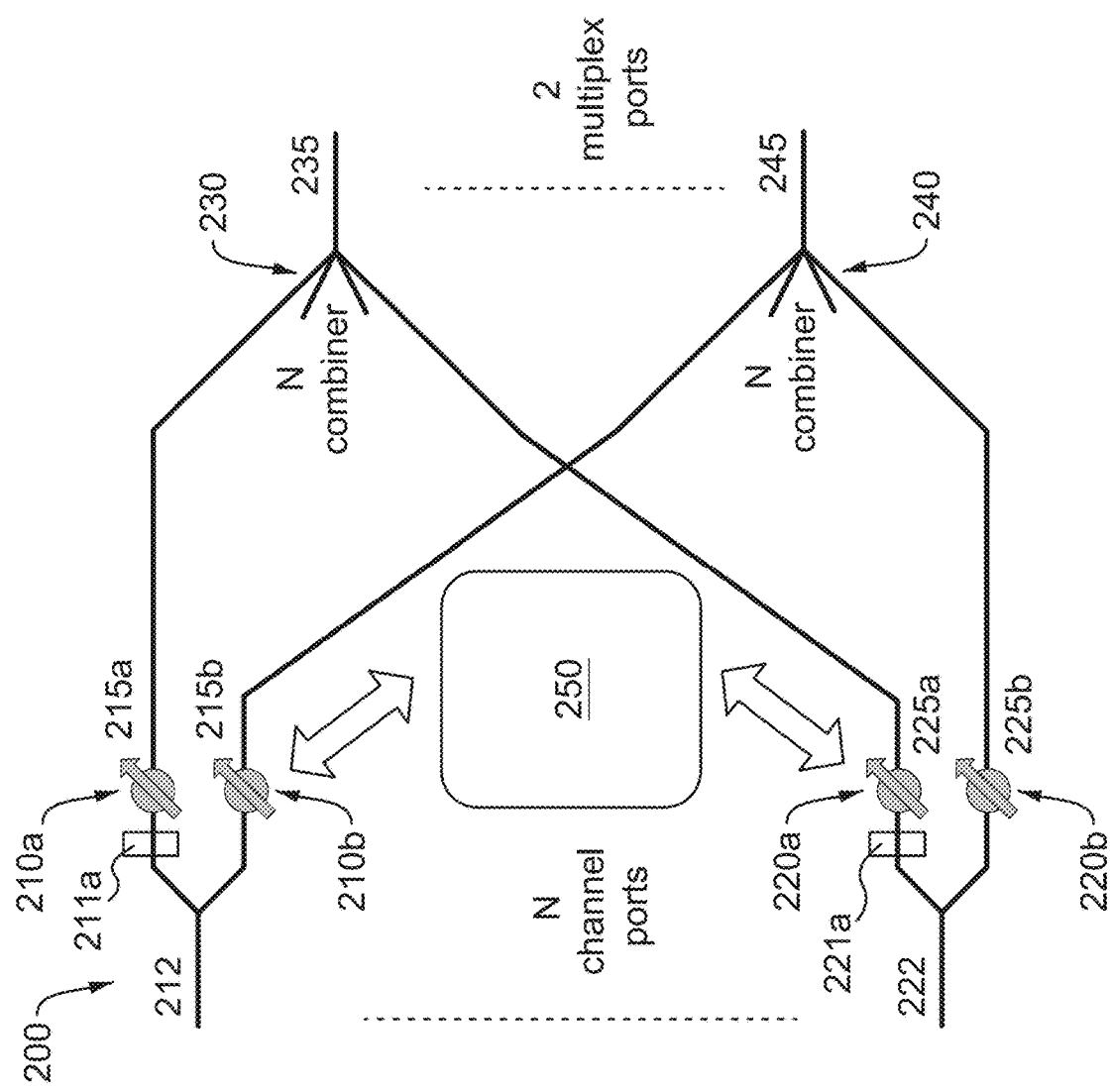
FIG. 2 shows a schematic of an apparatus that can be configured for multicast switching and broadcasting, according to some embodiments.

FIG. 2 shows a schematic of an apparatus 200 that can be configured for multicast switching and broadcasting, according to some embodiments. The apparatus 200 includes a first input port 212 connected to two switches 210a (referred to as the first switch) and 210b (referred to as the second switch), each of which is switchable between a first state (also referred to as a pass state) to transmit optical signals and a second state (also referred to as a block state) to block optical signals. The first switch 210a is connected to a first path 215a and the second switch 210b is connected to a second path 215b.

The apparatus 200 also includes a second input port 222 connected to two switches 220a (referred to as the third switch) and 220b (referred to as the fourth switch), each of which is also switchable between the first state to transmit optical signals and the second state to block optical signals. The third switch 220a is connected to a third path 225a and the fourth switch 220b is connected to a fourth path 225b.

The apparatus 200 further includes a first combiner 230 connected to the first path 215a and the third path 225a to combine possible signals delivered from the first path 215a and the third path 225a. A first output port 235 is connected to the first combiner 230 to deliver the combined signal(s). A second combiner 240 is connected to the second path 215b and the fourth path 225b to combine possible signals delivered from the third path 215b and the fourth path 225b. A second output port 245 is connected to the second combiner 240 to deliver the combined signal(s).

In some embodiments, one or more of the switches 210a, 210b, 220a, and 220b can be controlled manually. In some embodiments, one or more of the switches 210a, 210b, 220a, and 220b can be controlled by a controller 250. For example, the controller can select a switch to the first state or the second state based on the desired operation mode of the apparatus 200.

In operation, the four switches 210a, 210b, 220a, and 220b can have various combinations to configure the apparatus 200 into different operation modes. In some instances, the first switch 210a and the second switch 210b can be configured into the first state (i.e., pass state), while the third switch 220a and the fourth switch 220b can be configured into the second state (i.e., block state). In this case, the apparatus 200 can broadcast an input signal received by the first input 212 to both output ports 235 and 245.

In some instances, the first switch 210a and the second switch 210b can be configured into the second state (i.e., block state), while the third switch 220a and the fourth switch 220b can be configured into the first state (i.e., pass state). In this case, the apparatus 200 can broadcast an input signal received by the second input 222 to both output ports 235 and 245.

In some instances, the first switch 210a is configured in the first state and the second switch 210b is configured in the second state, in which case, the input signal from the first input port 212 is delivered to the first output port 235. The third switch 220a can be configured into the second state and the fourth switch 220b can be configured into the first state to deliver the input signal from the second input port 222 to the second output port 245.

In some instances, the input signal from the first input port 212 can be delivered to the second output port 245 and the input signal from the second input port 222 can be delivered to the first output port 235. In this mode, the first switch 210a can be configured in the second state and the second switch 210b is configured in the first state. The third switch 220a can be configured into the first state and the fourth switch 220b can be configured into the second state.

In some instances, all the switches 210a, 210b, 220a, and 220b are configured in the first state for broadcasting. In this mode, input signals from the first input port 212 are broadcast to both output ports 235 and 245, and input signals from the second input port 222 are also broadcast to both output ports 235 and 245.

In some instances, all the switches 210a, 210b, 220a, and 220b are configured in the second state (also referred to as all-block mode) for channel policing (also referred to as path policing). In this mode, the attribute of optical signal from each path (e.g., from first input port 212 to the first output port 235, or any other channel) can be measured by detectors before actually using the channels. This policing step can, for example, ensure that there are no wavelength "collisions" in couplers that are connected to the apparatus 200, thereby reducing the probability of traffic disruption. In some embodiments, the attribute of the optical signal can be the wavelength and/or power of the optical signal. In some embodiments, the attribute of the optical signal can be the polarization of the optical signal. In some embodiments, the attribute of the optical signal can be the spectrum of the optical signal.

In FIG. 2, the apparatus 200 includes two input ports 212 and 222 and two output ports 235 and 245 for illustration purposes. In practice, any other number of input ports and output ports can also be used. In general, the apparatus 200 can include M input ports and N output ports, where M and N are positive integers. In this case, each input port splits an input signal into N portions, each of which is directed to a corresponding switch (i.e., N switches for each input port). The number of combiners is also N and each combiner is connected to all M input ports. In some embodiments, the input port directs the input signal to all output ports simultaneously (e.g., in broadcast mode). In some embodiments, the input port directs the input signal to only one of the output ports (e.g., in switching mode). In some embodiments, the input port directs the input signal to a subset of the N output ports.

Figure 2A:
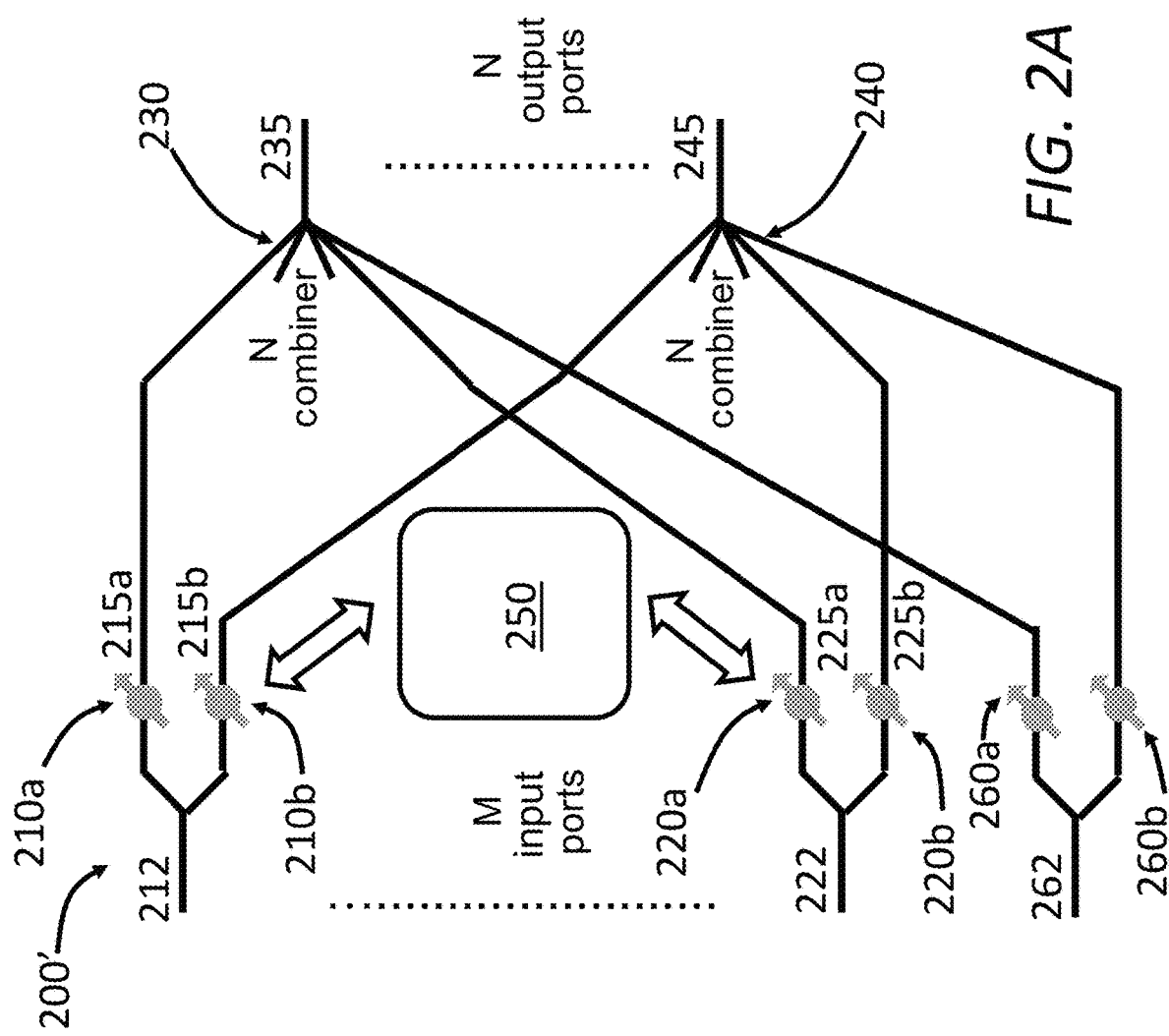
FIG. 2A shows a schematic of an apparatus that can be configured for multicast switching and broadcasting, according to yet other embodiments.

In some embodiments, the number of input ports M can be 2 to 2048 (e.g., 2, 4, 8, 16, 32, 64, 128, 256, 512, 1024, or 2048, including any values and sub ranges in between). In some embodiments, the number of output ports N can be 2 to 2048 (e.g., 2, 4, 8, 16, 32, 64, 128, 256, 512, 1024, or 2048, including any values and sub ranges in between). For example, FIG. 2A shows another example apparatus 200' that includes a third input port 262, connected to two switches 260a (referred to as a fifth switch) and 260b (referred to as a sixth switch), each of which is switchable between a first state (also referred to as a pass state) to transmit optical signals and a second state (also referred to as a block state) to block optical signals.

In some embodiments, the number of input ports and the number of output ports can be the same. In some embodiments, the number of input ports and the number of output ports can be different.

In some embodiments, the first combiner 230 and the first output port 235 can be different sections of a single-piece element, such as a 2×1 fiber coupler. In some embodiments, the first combiner 230 and the first output port 235 can be physically separate components and are removably coupled to each other.

The switches 210a, 210b, 220a, and 220b can include various types of switches to pass/block optical signals (collectively referred to as switches 210 and 220). In some embodiments, the switches 210 and 220 include variable optical attenuators (VOAs). The VOAs can pass the optical signals in the low-loss state and block the optical signals in the high-loss state. In some embodiments, the attenuation ratio of the VOAs can be greater than 15 dB (e.g., greater than 15 dB, greater than 20 dB, greater than 25 dB, or greater than 30 dB, including any values and sub ranges in between).

In some embodiments, the switches 210 and 220 can include electro-optical switches, which usually employ one or more electro-optical crystals with variable refractive index under an electric field. In some embodiments, the electro-optical crystal can include at least one of Lithium Niobate ($LiNbO_3$), Lithium Tantalate ($LiTaO_3$), Lead Zirconate Titanate ($Pb(Zr, Ti)O_3$), and Lead Lanthanum Zirconate Titanate ($Pb, La)(Zr, Ti)O_3$), among others. In some embodiments, the electro-optical switch can be based on Mach-Zehnder interferometers, in which an optical signal is split into two arms of the interferometers and changing the refractive index in one arm can alter the interference between the optical signals from the two arms. For example, a constructive interference can be configured as the first state to generate an output signal substantially identical to the input optical signal, while a destructive interference can be configured as the second state to generate an output signal with negligible power.

In some embodiments, the switches 210 and 220 can include acousto-optic switches, which use acoustic waves to change the transmission of the switches. In some embodiments, the switches 210 and 220 can include opto-mechanical switches, which usually redirect an optical signal by moving bulk fiber optic cable elements by mechanical devices. For example, an opto-mechanical switch can use a stepper motor to move a mirror that directs the optical signal light from the input to the desired output.

In some embodiments, the switches 210a, 210b, 220a, and 220b can also be employed for power balancing. For example, the input levels at the first input port 212 and the second input port 222 may be different. Accordingly, the signals arriving at the first combiner 230 from the first input port 212 and the second input port 222 can also be different, if no compensation or balancing is performed. In some embodiments, the first switch 210a can include, for example, a VOA 211a to attenuate the input signal from the first input port and/or the third switch 220a can include, for example, a VOA 221a to attenuate the input signal from the second input port. The attenuation allows the two signals arriving at the first combiner 230 to have substantially equal power, regardless of their respective input powers. Similar balancing can also be performed for the second combiner 240 in the second path 215b and the fourth channel 225b.

In some embodiments, the input ports 212 and 222 are connected to a wavelength source such as a transceiver (not shown). In some embodiments, the input ports 212 and 222 are in direct connection with a transceiver. In some embodiments, the input ports 212 and 222 are connected to a transceiver via an optical switch for direction selection (not shown). In some embodiments, the input ports 212 and 222 are connected to a transceiver via a wavelength multiplexer (not shown).

In some embodiments, the input ports 212 and 222 are configured to receive monochromatic input signals, i.e., optical signals having a single wavelength or a single spectral component. In some embodiments, the input ports 212 and 222 are configured to receive input signals having multiple spectral components, each of which is at a distinct wavelength.

The controller 250 in the apparatus 200 can include any suitable processor capable of executing computer instructions. Each module in the processor can be any combination of hardware-based module (e.g., a field-programmable gate array (FPGA), an application specific integrated circuit (ASIC), a digital signal processor (DSP) and/or software-based module (e.g., a module of computer code stored in memory and/or executed at the processor) configured to execute a specific function. The processor can be a microcontroller, a FPGA, an ASIC, or any other suitable processor configured to run and/or execute the modules. The processor and modules of the processor can be configured to collectively execute the methods described herein, and/or to implements the apparatuses described herein.

Figure 3:
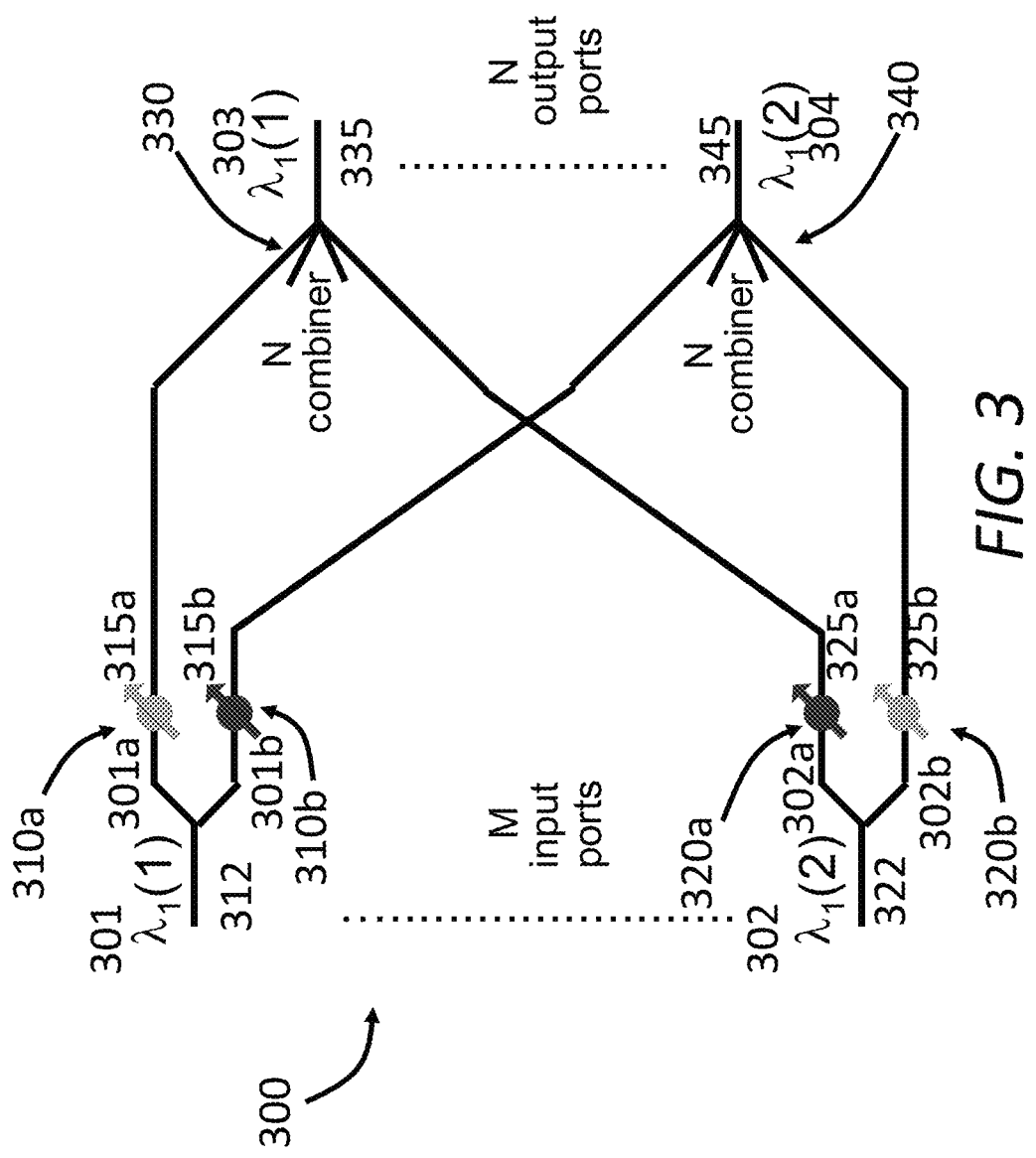
FIG. 3 shows a schematic of a reconfigurable multicast switch configured in the switching mode for multiplexing, according to some embodiments.

FIG. 3 shows a schematic of a reconfigurable multicast switch 300 configured in the switching mode for multiplexing, according to some embodiments. The multicast switch 300 includes a first input port 312 to receive a first optical signal 301 at a first wavelength Ai and splits the first optical signal 301 into a first portion 301a and a second portion 301b. The first portion 301a is sent to a first switch 310a connected to a first path 315a, and the second portion 301b is sent to a second switch 310b connected to a second path 315b.

The multicast switch 300 also includes a second input port 322 to receive a second optical signal 302 also at the first wavelength Ai and splits the second optical signal 302 into a third portion 302a and a fourth portion 302b. The third portion 302a is sent to a third switch 320a connected to a third path 325a, and the fourth portion 302b is sent to a fourth switch 320b connected to a fourth path 325b.

A first combiner 330 is connected to the first path 315a and the third path 325a, and a second combiner 340 is connected to the second path 315b and the fourth path 325b. Each combiner 330 and 340 is also connected to a corresponding output port 335 and 345, respectively. The first output 335 is configured to deliver a first output signal 303 and the second output port 345 is configured to deliver a second output signal 304.

In FIG. 3, the first switch 310a is set in the first state to pass the first portion 301a, which then travels to the first combiner 330. The second switch 310b is set in the second state to block the second portion 301b. The third switch 320a is set in the second state to block the third portion 302a, and the fourth switch 320b is set in the first state to pass the fourth portion 302b, which then travels to the second combiner 340. Accordingly, the first output signal 303 includes the first portion 301a and the second output signal 304 includes fourth portion 302b. The configuration in FIG. 3 allows the same wavelength (i.e., λ1) from different line data to be used on alternative ports on the same broadcast MCS.

Figure 4:
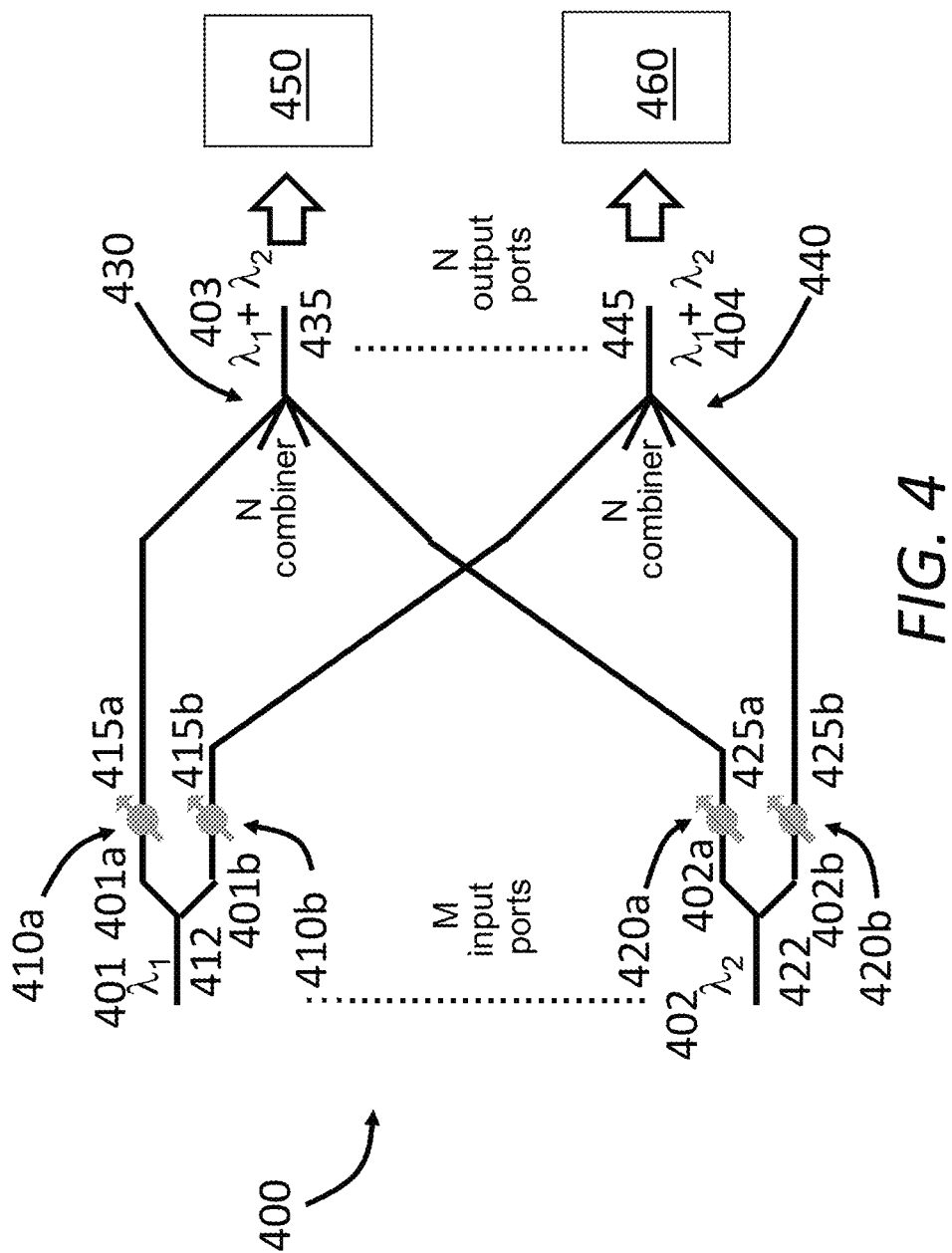
FIG. 4 shows a schematic of a reconfigurable multicast switch configured in the broadcast mode for multiplexing, according to some embodiments.

FIG. 4 shows a schematic of a reconfigurable multicast switch 400 configured in the broadcast mode for multiplexing, according to some embodiments. The multicast switch 400 includes a first input port 412 to receive a first optical signal 401 at a first wavelength λ1 and splits the first optical signal 401 into a first portion 401a and a second portion 401b. The first portion 401a is sent to a first switch 410a connected to a first path 415a, and the second portion 401b is sent to a second switch 410b connected to a second path 415b.

The multicast switch 400 also includes a second input port 422 to receive a second optical signal 402 at a second wavelength λ2 and splits the second optical signal 402 into a third portion 402a and a fourth portion 402b. The second wavelength λ2 is different from the first wavelength λ1. The third portion 402a is sent to a third switch 420a connected to a third path 425a, and the fourth portion 402b is sent to a fourth switch 420b connected to a fourth path 425b.

A first combiner 430 is connected to the first path 415a and the third path 425a, and a second combiner 440 is connected to the second path 415b and the fourth path 425b. Each combiner 430 and 440 is also connected to a corresponding output port 435 and 445, respectively. The first output 435 is configured to deliver a first output signal 403, and the second output port 445 is configured to deliver a second output signal 404. The first output signal 403 is directed to a first multiplexer 450 and the second output signal 404 is directed to a second multiplexer 460.

In FIG. 4, the four switches 410a, 410b, 410c, and 410d are all configured in the first state to pass optical signals. Accordingly, the first output signal 403 includes the sum of the first portion 401a of the first optical signal 401 and the third portion 402a of the second optical signal 402. The second output signal 403 includes the sum of the second portion 402a of the first optical signal 401 and the fourth portion 402b of the second optical signal 402. Therefore, this mode shown in FIG. 4 allows the same wavelength (common line data) to be transmitted to both output ports simultaneously.

The multicast switches 300 and 400 shown in FIG. 3 and FIG. 4, respectively, can have identical hardware structure, and the switches can be set in different combination to achieve different operation modes.

Figure 5:
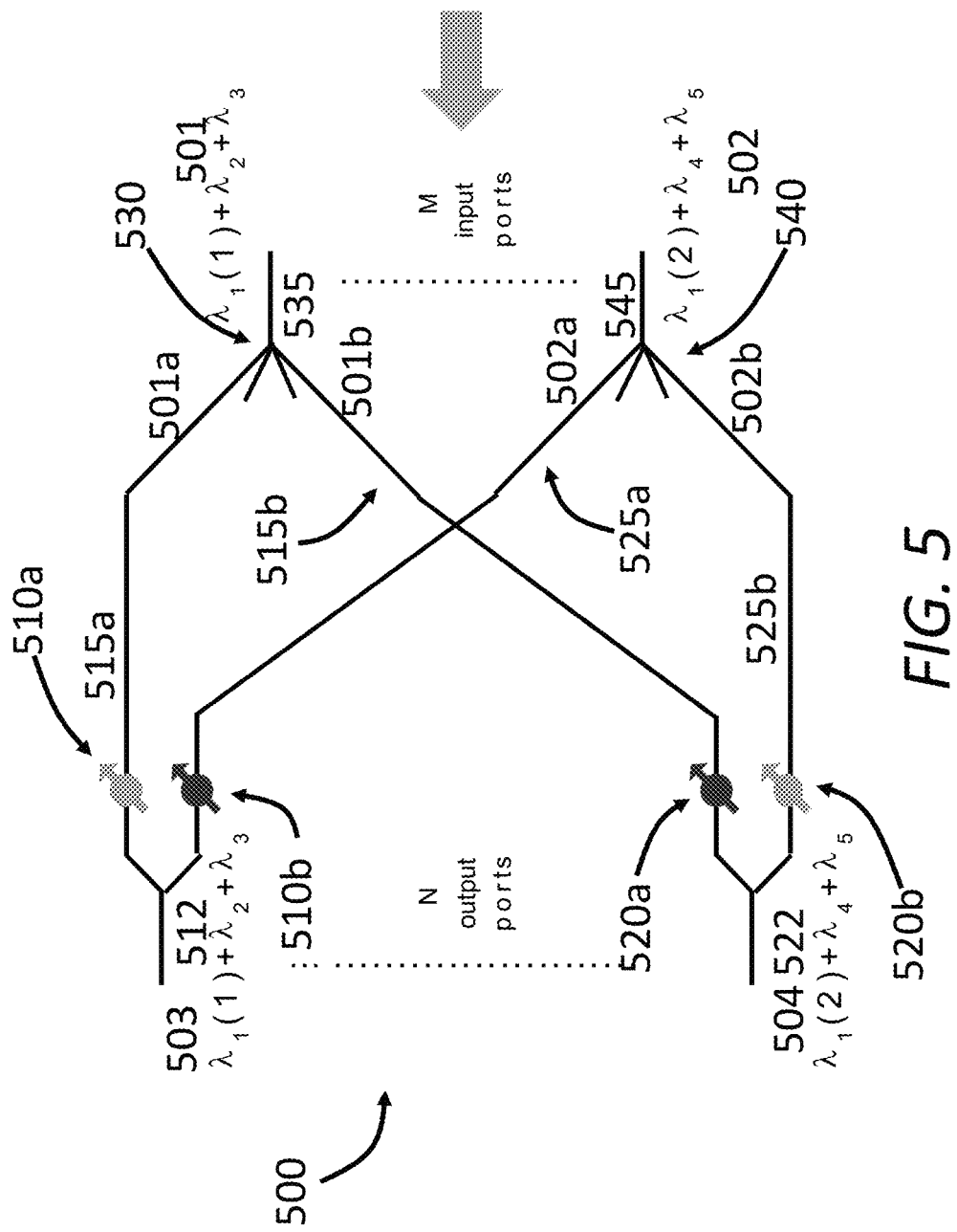
FIG. 5 shows a schematic of a reconfigurable multicast switch configured in the standard mode for demultiplexing, according to some embodiments.
Figure 6:
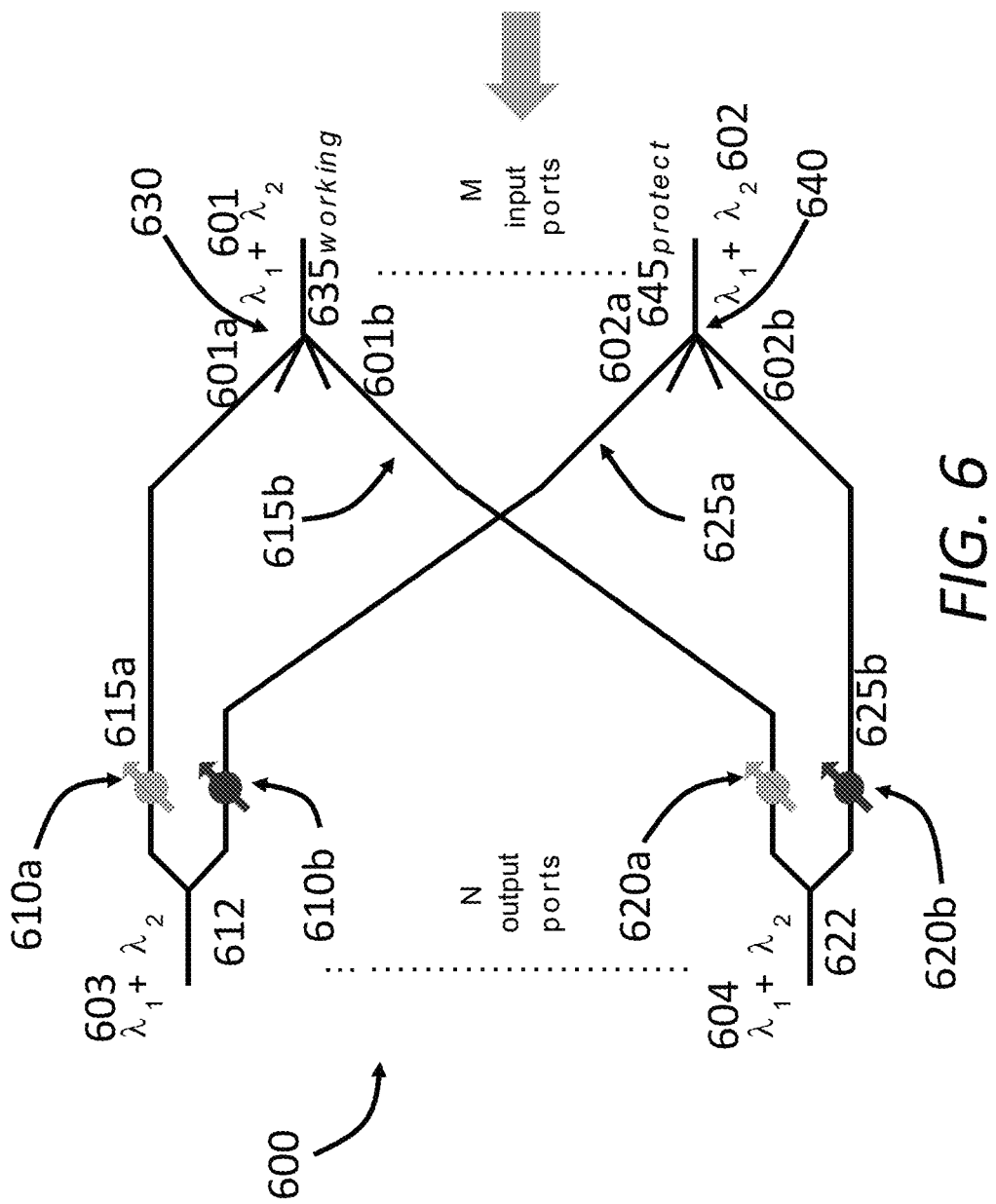
FIG. 6 shows a schematic of a reconfigurable multicast switch configured in the protection mode for demultiplexing, according to some embodiments.

FIG. 5 shows a schematic of a reconfigurable multicast switch 500 configured in the standard mode for demultiplexing, according to some embodiments. In FIGS. 3 and 4, the communication is east bound. In FIGS. 5 and 6, the communication is west bound. The multicast switch 500 includes a first input port 535 to receive a first optical signal 501 and a first splitter 530 to split the first optical signal 501 into a first portion 501a and a second portion 501b. The first portion 501a is sent to a first path 515a including a first switch 510a, and the second portion 501b is sent to a second path 515b including a second switch 510b. A first output port 512 is connected to the two switches 510a and 510b to deliver signals transmitted through these two switches 510a and 510b.

The multicast switch 500 also includes a second input port 545 to receive a second optical signal 502 and a second splitter 540 to split the second optical signal 502 into a third portion 502a and a fourth portion 502b. The third portion 502a is sent to a third path 525a including a third switch 520a, and the fourth portion 502b is sent to a fourth path 525b including a fourth switch 520b. A second output port 522 is connected to the two switches 520a and 520b to deliver signals transmitted through these two switches 520a and 520b.

In FIG. 5, the first optical signal 501 includes a first spectral component at a first wavelength $\lambda_1$, a second spectral component at a second wavelength $\lambda_2$, and a third spectral component at a third wavelength $\lambda_3$. The second optical signal 502 includes a fourth spectral component at the first wavelength $\lambda_1$, a fifth spectral component at a fourth wavelength $\lambda_4$, and a sixth spectral component at a fifth wavelength $\lambda_5$. The first switch 510a is set in the first state to pass the first portion 501a, the second switch 510b is set in the second state to block the third portion 502a, the third switch 520a is set in the second state to block the second portion 501b, and the fourth switch 520b is set in the first state to pass the fourth portion 502b. The net result is that the first output signal 503 includes spectral components at $\lambda_1$, $\lambda_2$, and $\lambda_3$, and the second output signal 504 includes spectral components at $\lambda_1$, $\lambda_4$, and $\lambda_5$.

The apparatus 500 can be combined with the apparatus 300 and 400 shown in FIGS. 3 and 4, respectively, to form a bi-directional device. For example, the output ports 512 in the multicast switch 500 and the input ports 412 in the multicast 400 can be disposed on one side of a chip. And the input ports 535 and 545 in the apparatus 500 and the output ports 435 and 445 in the apparatus 400 can be disposed on the other side of the same chip. In some embodiments, the chip can be an integrated circuit chip (also referred to as a module) and the input ports and output ports can be connected with fibers. In some embodiments, the chip can be a printed circuit. In some embodiments, the chip can be a semiconductor substrate and the input ports and output ports can be connected via semiconductor waveguides fabricated in or on the substrate.

In some embodiments, the array of output ports for east bound communication and the array of input ports for west bound communication can be disposed in an interdigitated manner. For example, the first output port for east bound communication can be adjacent to the first input port for east bound communication, and the second output port for east bound communication can be adjacent to the second input port for east bound communication, etc.

In some embodiments, the array of output ports for east bound communication can be grouped together and disposed on one section of a chip, and the array of input ports for west bound can be grouped together and disposed on another section of the chip.

FIG. 6 shows a schematic of a reconfigurable multicast switch 600 configured in the protection mode for demultiplexing, according to some embodiments. The communication in this multicast switch 600 can be westbound as illustrated by the arrow. The multicast switch 600 includes a first input port 635 to receive a first optical signal 601 and a first splitter 630 to split the first optical signal 601 into a first portion 601a and a second portion 601b. The first portion 601a is sent to a first path 615a including a first switch 610a, and the second portion 601b is sent to a second path 615b including a second switch 610b. A first output port 612 is connected to the two switches 610a and 610b to deliver signals transmitted through these two switches 610a and 610b.

The multicast switch 600 also includes a second input port 645 to receive a second optical signal 602 and a second splitter 640 to split the second optical signal 602 into a third portion 602a and a fourth portion 602b. The third portion 602a is sent to a third path 625a including a third switch 620a, and the fourth portion 602b is sent to a fourth path 625b including a fourth switch 620b. A second output port 622 is connected to the two switches 620a and 620b to deliver signals transmitted through these two switches 620a and 620b.

In FIG. 6, the first optical signal 601 includes a first spectral component at a first wavelength $\lambda_1$ and a second spectral component at a second wavelength $\lambda_2$. The second optical signal 602 includes a third spectral component at the first wavelength $\lambda_1$ and a fourth spectral component at the second wavelength $\lambda_2$. In some embodiments, the first optical signal 601 and the second optical signal 602 can be substantially identical.

The first switch 610a is set in the first state to pass the first portion 601a, the second switch 610b is set in the second state to block the third portion 602a, the third switch 620a is set in the first state to pass the second portion 601b, and the fourth switch 620b is set in the second state to block the fourth portion 602b. The net result is that the first optical signal 601 received by the first input port 635 is broadcast to both output ports 612 and 622.

In some instances, in response to unsatisfactory signal received at the output port 612 or 622, the apparatus 600 can close the switches 610a and 620a (i.e. set them into the second state), and open the switches 610b and 620b (i.e., set them into the first state). This change of switching configuration can broadcast the second optical signal 602 to both output ports 612 and 622. In some embodiments, measurements are performed at the input ports 635 and 645. In response to unsatisfactory input signals, the apparatus 600 can also close the switches 610a and 620a (i.e. set them into the second state), and open the switches 610b and 620b (i.e., set them into the first state).

Figure 7:
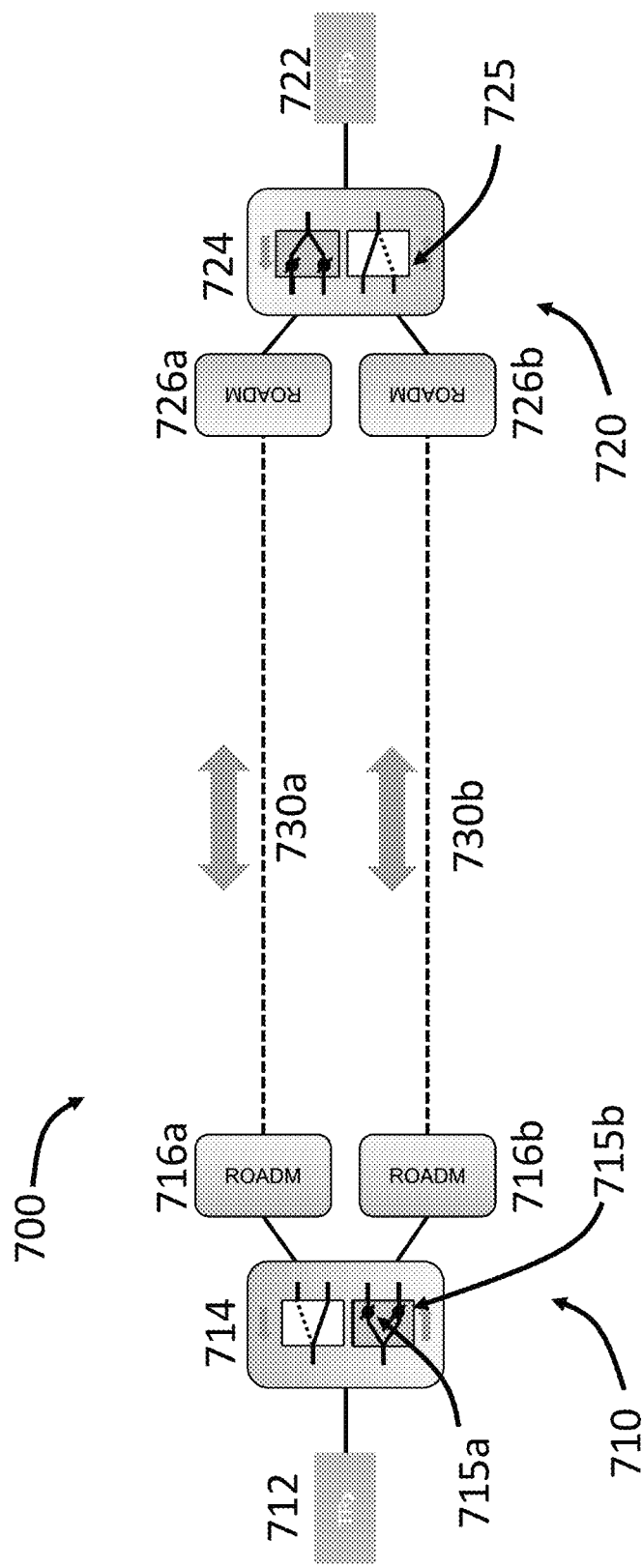
FIG. 7 shows a schematic of an optical network reconfigurable between a 1+1 protection scheme and a 1:1 protection scheme, according to some embodiments.

FIG. 7 shows a schematic of an optical network 700 reconfigurable between a 1+1 protection scheme and a 1:1 protection scheme, according to some embodiments. The optical network 700 includes a first node 710 and a second node 720 communicating with each other via two paths 730a and 730b. The following description uses the east bound communication for illustration and the communication on the reverse direction can be substantially symmetric.

The first node 710 includes a transceiver 712 to deliver an optical signal that is received by a reconfigurable optical switch 714. The reconfigurable optical switch 714 includes a first switch 715a to receive a first portion of the optical signal and is connected to a first ROADM 716a. The reconfigurable optical switch 714 also includes a second switch 715b to receive a second portion of the optical signal and is connected to a second ROADM 716b. The first ROADM 716a and the second ROADM 716b are connected to the first path 730a and second path 730b, respectively.

On the tail end, the second node 720 includes a first ROADM 726a connected to the first path 730a and a second ROADM 726b connected to the second path 730b. A reconfigurable optical switch 724 is connected to the two ROADMs 726a and 726b. In some embodiments, the reconfigurable optical switch 724 includes a 2×1 switch 725 with each of its two input channels connected to a corresponding ROADM 716a/b. The second node also includes a transceiver 722 to receive the signal from the reconfigurable optical switch 724.

The transceivers 712 and 722 can include one or more types of transmitters. In some embodiments, the transmitter can include a coherent transmitter. In some embodiments, the transmitter can include a C-form pluggable generation (CFP) transmitter. In some embodiments, the transmitter can include a CFP4 transmitter, which can be coherent or non-coherent. In some embodiments, the transmitter can include a C-form pluggable generation 2—analog coherent optics (CFP2-ACO) transmitter that is coupled with a digital signal processor (DSP) chip through a pluggable interface.

In some embodiments, the transmitter can include a coherent in-phase/quadrature transmitter integrated together with a DSP within a physical module. In some embodiments, the transmitter can include a C-form pluggable generation-digital coherent optics (CFP-DCO) transmitter integrated with a DSP and an optical front end. In some embodiments, the transmitter can include a Quad Small Form-factor Pluggable (QSFP) transmitter. In some embodiments, the transmitter can include a QSFP28 transmitter. These transmitters can be coherent or incoherent.

The ROADMs 716a, 716b, 726a, and 726b (collectively referred to as the ROAMDs 716 and 726) can be based on various approaches. In some embodiments, the ROADMs 716 and 726 can be based on include wavelength blockers (WBs). In some embodiments, the ROADMs 716 and 726 can be based on small switch arrays (SSAs). In some embodiments, the ROADMs 716 and 726 can use wavelength selective switches (WSSs). In some embodiments, the ROADMs 716 and 726 can be based on optical cross-connect (OXC).

The optical network 700 can be reconfigurable between a 1+1 protection scheme and a 1:1 protection scheme. In the 1+1 protection scheme, the first switch 715a and the second switch 715b in the first node 710 are both set at the pass state to transmit the first portion of the optical signal to the first path 730a and at the same time transmit the second portion of the optical signal to the second path 730b. This configuration of the reconfigurable optical switch 714 is also referred to as the broadcast mode.

At the tail end, the switch 725 can select the first portion of the optical signal from the first path 730a using the 2×1 switch 725. In the event that a failure is detected in the first path 730a, the optical network 700 can close (e.g., via a controller, such as the controller 250 shown in FIG. 2) the primary path and use the second path 730b for communication by turning the 2×1 switch 725 to the lower path (i.e., 730b).

In some embodiments, the path failure can be determined based on the overall optical power measured after the switch 725. For example, a detector (not shown) can be used to measure the amplitude, power, and/or intensity of the received signal. The measured signal is then transmitted to a controller. When the measured signal is below a threshold value, the controller can determine that a failure in the primary path occurs and switch the transmission path from the first path 730a to the second path 730b.

In some embodiments, the path failure can be determined based on the optical power of one spectral component in the received signal. In some embodiments, the path failure can be determined based on the optical power of a sub-group of spectral components in the received signal. In these embodiments, a spectral analyzer (not shown) can be used to measure the spectral power of the received signal.

In some embodiments, the path failure can be determined based on the signal-to-noise ratio (SNR) of the received signal. In some embodiments, the path failure can be determined based on the bit error rate (BER) in the data received. In some embodiments, the path failure can be determined based on measurements of the attribute(s) (e.g., overall power, spectral power, signal-to-noise ratio, and/or BER, etc.) of the optical signal at the two inputs of the switch 725.

In the 1:1 protection scheme, the first switch 715a in the first node 710 can be set in the first state to pass the first portion of the optical signal to the first path 730a, while the second switch 715b is set in the second state to block the second portion of the optical signal. The 2×1 switch 725 then connects the transceiver 722 to the first path 730a so as to receive the first portion of the optical signal.

In the event that a path failure is detected, the first switch 715a is switched to the second state to block the first portion of the optical signal and the second switch 715b is switched to the first state to transmit the second portion of the optical signal. At the tail end, the 2×1 switch 725 is also switched to connect the transceiver 722 to the second path 730b so as to receive the second portion of the optical signal.

In some embodiments, the switching between the 1+1 protection scheme and the 1:1 protection scheme can be carried out manually (e.g., by an operator). In some embodiments, a controller (e.g., like the controller 250 shown in FIG. 2) can be used to automatically switch the optical network 700 between the two protection schemes. For example, upon execution of processor-executable instructions, the controller sends a first control signal to select the two switches 715a and 715b into the first state so as to configure the network 700 into the 1+1 protection scheme. In the event it is desirable to switch protection schemes, the controller sends a second control signal to select the first switch 715a into the second state. The controller can further send a third control signal to select the first switch 715a back to the first state and the second switch 715b into the second state to change path within the 1:1 protection scheme.

In the optical network 700, the 1:1 protection scheme can reserve the bandwidth on the secondary path (e.g., 730b) and allow for quick switch over. The 1+1 protection scheme, when used with appropriate multiplexing, allows for lower grade traffic to be configured on the secondary path (e.g., 730b) and then dropped in the event of a failure on the primary path (i.e. different levels of service). Allowing the customer to configure the optical network 700 in either of these modes allows for more robust and more efficient use of network resources. In some embodiments, this switching between 1+1 and 1:1 schemes can be carried out during channel provisioning. In some embodiments, the switching can be carried out as part of a more comprehensive network optimization and automation scheme via the controller.

FIG. 7 illustrates that the optical network 700 can have 1+1 protection capability by using the reconfigurable optical switch 714 in the head end and configuring the reconfigurable optical switch 714 into the broadcast mode. In contrast, optical networks using known multicast switches usually do not have the capability to implement 1+1 protection scheme.

In addition, the optical network 700 can also be readily switched between the 1+1 protection scheme and the 1:1 protection scheme. The switching (or reconfiguration) can be carried out remotely using software control, without changing any of the hardware component in the optical network 700. Therefore, the optical network 700 can have significant flexibility in practice without the complexity to coordinate between the first node 710 and the second node 720.

Figure 8:
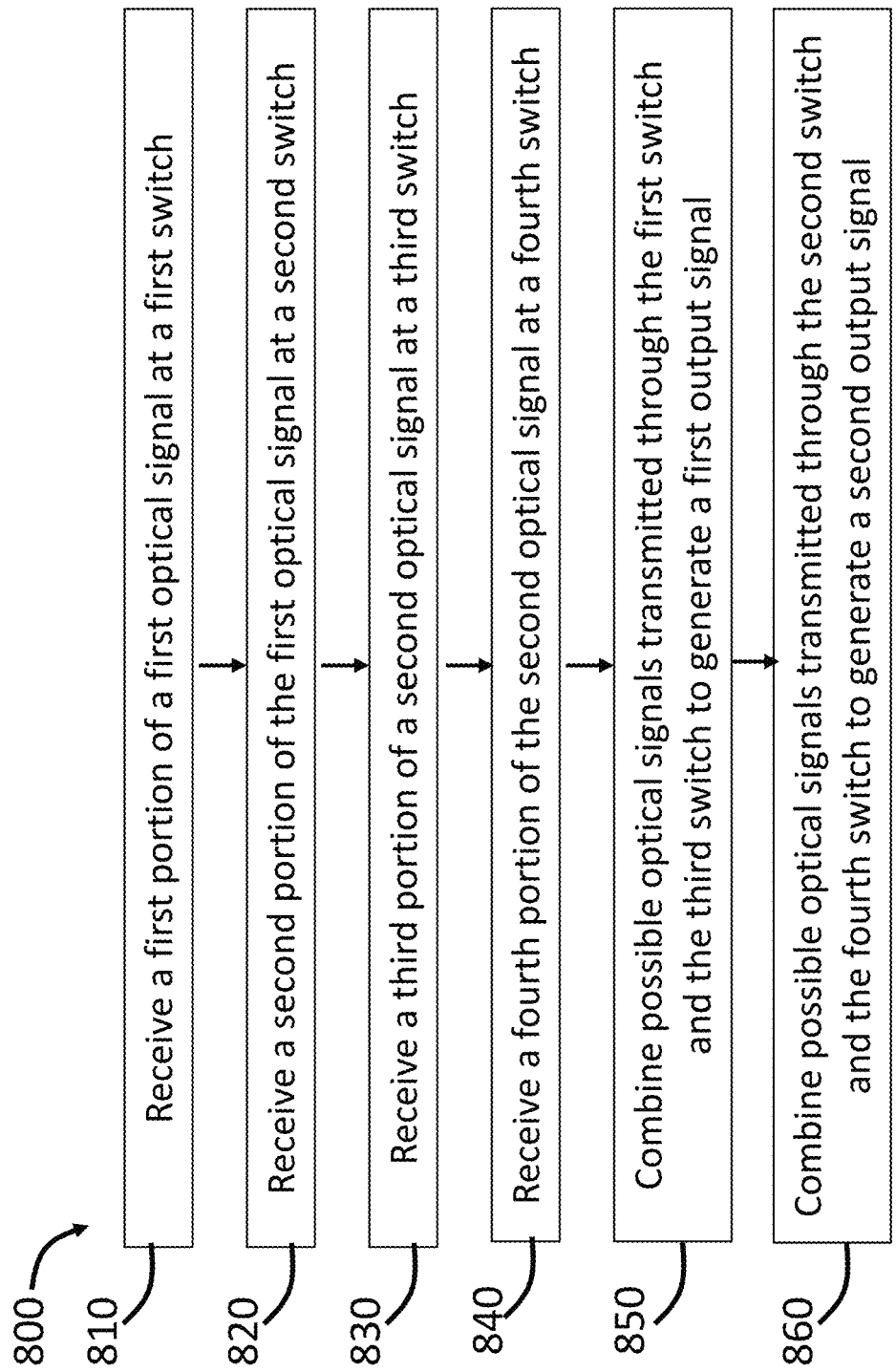
FIG. 8 illustrates a method of optical communication, according to some embodiments.

FIG. 8 illustrates a method 800 of optical communication, according to some embodiments. The method 800 includes, at 810, receiving a first portion of a first optical signal at a first switch switchable between a first state to pass the first portion and a second state to block the first portion. At 820, a second portion of the first optical signal is received at a second switch switchable between the first state and the second state. The method 800 also includes receiving a third portion of a second optical signal at a third switch switchable between the first state and the second state at 830 and receiving a fourth portion of the second optical signal at a fourth switch switchable between the first state and the second state at 840. At 850, possible optical signals transmitted through the first switch and the third switch are combined to generate a first output signal. At 860, possible optical signals transmitted through the second switch and the fourth switch are combined to generate a second output signal.

In some embodiments, the first switch includes a first variable optical attenuator (VOA) and the third switch includes a third VOA. These two VOAs can be used for power balancing between the first portion and the third portion. For example, the input level of the first portion of the first optical signal may be different from the input level of the third portion of the second optical signal. By changing the transmission ratio of at least one of these two portions, the power level upon combination (e.g., at 850) can be substantially identical. Similarly, power balancing can also be used for the second switch and the fourth switch, or any other group of switches.

In some instances, the first optical signal and the second optical signal are at a first wavelength, and the method 800 further includes selecting the first switch into the first state to transmit the first portion and selecting the third switch into the second state to block the third portion. Accordingly, the first output signal includes the first portion of the first optical signal and does not include the third portion of the second optical signal. The method 800 can also include selecting the second switch into the second state to block the second portion and selecting the fourth switch into the first state to transmit the fourth portion. Accordingly, the second output signal includes the fourth portion of the second optical signal.

In some instances, the first optical signal is at a first wavelength and the second optical signal is at a second wavelength different from the first wavelength. In these instances, the method 800 further includes selecting the first switch, the second switch, the third switch, and the fourth switch into the first state. The first output signal in this case includes the first portion and the third portion, and the second output signal includes the second portion and the fourth portion.

In some instances, the method 800 further includes selecting the first switch, the second switch, the third switch, and the fourth switch to operate between a first operation mode and a second operation mode. In the first operation mode, the first switch is configured in the first state, the second switch is configured in the second state, the third switch is configured in the second state, and the fourth switch is configured in the first state. In the second operation mode, the first switch, the second switch, the third switch, and the fourth switch are all configured in the first state.

In some instances, the method 800 further includes transmitting the first output signal to a first multiplex port on a multiplexer and transmitting the second output signal to a second multiplexer.

In some instances, the first optical signal has a first spectral component at a first wavelength and a second spectral component at a second wavelength, and the second optical signal has a third spectral component at the first wavelength and a fourth spectral component at a fourth wavelength. The method 800 further includes selecting the first switch into the first state to transmit the first portion of the first optical signal and selecting the second switch into the second state to block the third portion of the second optical signal. The method 800 further includes selecting the third switch into the second state to block the second portion of the first optical signal and selecting the fourth switch into the first state to transmit the fourth portion of the second optical signal.

In some instances, the first optical signal has a first spectral component at a first wavelength and a second spectral component at a second wavelength, and the second optical signal has a third spectral component at the first wavelength and a fourth spectral component at the second wavelength. The method 800 further includes selecting the first switch into the first state to transmit the first portion of the first optical signal and selecting the second switch into the second state to block the third portion of the second optical signal. The method 800 further includes selecting the third switch into the first state to transmit the second portion of the first optical signal and selecting the fourth switch into the second state to block the fourth portion of the second optical signal.

In some instances, the method 800 further includes transmitting a third optical signal to the first switch and the third switch. The method 800 also includes selecting the first switch and the third switch in to the first state to transmit the third optical signal to a first input port. The method 800 further includes transmitting a fourth optical signal, substantially identical to the third optical signal, to the second switch and the fourth switch, and selecting the second switch and the fourth switch into the second state to block the fourth optical signal. At least one attribute of the third optical signal at the first input port is then detected. In response to the attribute of the third optical signal being unsatisfactory (e.g., less than a threshold value), the first switch and the third switch are turned into the second state, and the second switch and the fourth switch are turned into the first state.

In some instances, the attribute of the third optical signal includes the overall amplitude (or power) of the third optical signal. In some instances, the attribute of the third optical signal includes the amplitude (or power) of one spectral component in the third optical signal. In some instances, the attribute of the third optical signal includes the signal-to-noise ratio (SNR) of the third optical signal. In some instances, the attribute of the third optical signal includes the bit error rate (BER) of the third optical signal.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
   a first input port;
   a first switch, in optical communication with the first input port and switchable between a first state to pass optical signals and a second state to block optical signals;
   a second switch, in optical communication with the first input port and switchable between the first state and the second state, at least one of the first switch and the second switch includes a variable optical attenuator (VOA) configured to balance power between the optical signals passed from the first switch and optical signals passed from the second switch, the first input port configured not to be connected to other switches;
   a second input port;
   a third switch, in optical communication with the second input port and switchable between the first state and the second state;
   a fourth switch, in optical communication with the second input port and switchable between the first state and the second state;
   a first combiner in optical communication with the first input port via the first switch and the second input port via the third switch; and
   a second combiner in optical communication with the first input port via the second switch and the second input port via the fourth switch,
   the optical signals passed from the first switch and optical signals passed from the second switch including a first portion of a first optical signal and a second portion of the first optical signal, respectively,
   the optical signals passed from the third switch and optical signals passed from the fourth switch including a third portion of a second optical signal and a fourth portion of the second optical signal, respectively, and
   the VOA configured to balance power between the optical signals by changing a transmission ratio of at least one of an input level of the first portion of the first optical signal and an input level of the third portion of the second optical signal such that the power level upon combination is substantially identical.

2. The apparatus of claim 1, further comprising:
   a third input port;
   a fifth switch, in optical communication with the third input port and switchable between the first state and the second state; and
   a sixth switch, in optical communication with the third input port and switchable between the first state and the second state,
   the first combiner being in optical communication with the third input port via the fifth switch and the second combiner being in optical communication with the third input port via the sixth switch.

3. The apparatus of claim 1, wherein:
   the first input port is configured to pass a first optical signal at a first wavelength,
   the first switch is selected into the first state to pass the first optical signal to the first combiner,
   the second switch is selected to the second state to block the first optical signal from the second combiner,
   the second input port is configured to pass a second optical signal at the first wavelength,
   the third switch is selected to the second state to block the second optical signal from the first combiner, and
   the fourth switch is selected to the first state to pass the second optical signal to the second combiner.

4. The apparatus of claim 1, wherein:
   the first input port is configured to pass a first optical signal at a first wavelength,
   the first switch and the second switch are selected into the first state to pass the first optical signal to the first combiner and the second combiner,
   the second input port is configured to pass a second optical signal at a second wavelength different from the first wavelength,
   the third switch and the fourth switch are selected to the first state to pass the second optical signal to the first combiner and the second combiner.

5. The apparatus of claim 1, further comprising:
   a controller, operatively coupled to the first switch, the second switch, the third switch, and the fourth switch, to control the apparatus between a first operation mode, a second operation mode, and a third operation mode,
   in the first operation mode, the first switch being configured in the first state, the second switch being configured in the second state, the third switch being configured in the second state, and the fourth switch being configured in the first state,
   in the second operation mode, the first switch, the second switch, the third switch, and the fourth switch being configured in the first state,
   in the third operation mode, the first switch, the second switch, the third switch, and the fourth switch being configured in the second state.

6. The apparatus of claim 1, wherein the first combiner is operatively coupled to a first multiplexer and the second combiner is connected to a second multiplexer.

7. The apparatus of claim 1, further comprising:
   a first splitter configured to receive a first optical signal having a first spectral component at a first wavelength and a second spectral component at a second wavelength, the first splitter splitting the first optical signal into a first portion and a second portion;
   a second splitter configured to receive a second optical signal having a third spectral component at the first wavelength and a fourth spectral component at a fourth wavelength, the second splitter splitting the second optical signal into a third portion and a fourth portion;
   a fifth switch, in optical communication with the first splitter and configured in the first state, to transmit the first portion of the first optical signal;

a sixth switch, in optical communication with the second splitter and configured in the second state, to block the first portion of the second optical signal;
a first output port, in optical communication with the fifth switch and the sixth switch, to transmit the first portion of the first optical signal transmitted through the fifth switch;
a seventh switch, in optical communication with the first splitter and configured in the second state, to block the second portion of the first optical signal;
an eighth switch, in optical communication with the second splitter and configured in the first state, to transmit the second portion of the second optical signal; and
a second output port, in optical communication with the seventh switch and the eighth switch, to transmit the second portion of the second optical signal transmitted through the eighth switch.

8. The apparatus of claim 1, further comprising:
a first splitter configured to receive a first optical signal having a first spectral component at a first wavelength and a second spectral component at a second wavelength, the first splitter splitting the first optical signal into a first portion and a second portion;
a second splitter configured to receive a second optical signal having a third spectral component at the first wavelength and a fourth spectral component at the second wavelength, the second splitter splitting the second optical signal into a third portion and a fourth portion;
a fifth switch, in optical communication with the first splitter and configured in the first state, to transmit the first portion of the first optical signal;
a sixth switch, in optical communication with the second splitter and configured in the second state, to block the first portion of the second optical signal;
a first output port, in optical communication with the fifth switch and the sixth switch, to transmit the first portion of the first optical signal transmitted through the fifth switch;
a seventh switch, in optical communication with the first splitter and configured in the first state, to transmit the second portion of the first optical signal;
an eighth switch, in optical communication with the second splitter and configured in the second state, to block the second portion of the second optical signal; and
a second output port, in optical communication with the seventh switch and the eighth switch, to transmit the second portion of the first optical signal transmitted through the seventh switch.

9. The apparatus of claim 1, further comprising:
a controller, operatively coupled to the first switch, the second switch, the third switch, and the fourth switch, to select the apparatus between a first operation mode and a second operation mode, wherein:
in the first operation mode, the first input port being in optical communication with the first combiner and being optically blocked from the second combiner, and the second input port being in optical communication with the second combiner and being optically blocked from the first combiner, and
in the second operation mode, the first input port being in communication with the first combiner and being optically blocked from the second combiner, and the second input port being in optical communication with the first combiner and optically blocked from the second combiner.

10. A method, comprising:
receiving a first portion of a first optical signal at a first switch switchable between a first state to pass the first portion and a second state to block the first portion, the first switch including a variable optical attenuator (VOA);
receiving a second portion of the first optical signal at a second switch switchable between the first state and the second state, the first optical signal not divided into additional portions;
receiving a third portion of a second optical signal at a third switch switchable between the first state and the second state, the third switch including a VOA;
receiving a fourth portion of the second optical signal at a fourth switch switchable between the first state and the second state;
changing transmission of at least one of the first VOA or the third VOA to balance power in the first portion and the third portion;
combining possible optical signals transmitted through the first switch and the third switch to generate a first output signal; and
combining possible optical signals transmitted through the second switch and the fourth switch to generate a second output signal,
the optical signals passed from the first switch and optical signals passed from the second switch including a first portion of a first optical signal and a second portion of the first optical signal, respectively,
the optical signals passed from the third switch and optical signals passed from the fourth switch including a third portion of a second optical signal and a fourth portion of the second optical signal, respectively, and
the VOA configured to balance power between the optical signals by changing a transmission ratio of at least one of an input level of the first portion of the first optical signal and an input level of the third portion of the second optical signal such that the power level upon combination is substantially identical.

11. The method of claim 10, further comprising:
transmitting a third optical signal to the first switch and the third switch;
selecting the first switch and the third switch in to the first state to transmit the third optical signal to a first input port;
transmitting a fourth optical signal, substantially identical to the third optical signal, to the second switch and the fourth switch;
selecting the second switch and the fourth switch into the second state to block the fourth optical signal;
detecting an amplitude of the third optical signal at the first input port;
in response to the amplitude of the third optical signal less than a threshold value, selecting the first switch and the third switch into the second state and selecting the second switch and the fourth switch into the first state.

12. The method of claim 10, wherein the first optical signal has a first spectral component at a first wavelength and a second spectral component at a second wavelength, the second optical signal has a third spectral component at the first wavelength and a fourth spectral component at the second wavelength, and the method further comprises:
selecting the first switch into the first state, to transmit the first portion of the first optical signal;

selecting the second switch into the second state to block the third portion of the second optical signal;

selecting the third switch into the first state to transmit the second portion of the first optical signal; and selecting the fourth switch into the second state to block the fourth portion of the second optical signal.

13. The method of claim 10, wherein the first optical signal and the second optical signal are at a first wavelength, the method further comprising:

selecting the first switch into the first state to transmit the first portion;

selecting the third switch into the second state to block the third portion so as to generate the first output signal including the first portion of the first optical signal and not including the third portion of the second optical signal, selecting the second switch into the second state to block the second portion; and selecting the fourth switch into the first state to transmit the fourth portion so as to generate the second output signal including the fourth portion of the second optical signal and not including the fourth portion of the second optical signal.

14. The method of claim 10, wherein the first optical signal is at a first wavelength and the second optical signal is at a second wavelength different from the first wavelength, the method further comprising:

selecting the first switch, the second switch, the third switch, and the fourth switch into the first state to generate the first output signal including the first portion and the third portion and to generate the second output signal including the second portion and the fourth portion.

15. The method of claim 10, further comprising:

selecting the first switch, the second switch, the third switch, and the fourth switch to operate between a first operation mode and a second operation mode, in the first operation mode, the first switch being configured in the first state, the second switch being configured in the second state, the third switch being configured in the second state, and the fourth switch being configured in the first state, and in the second operation mode, the first switch, the second switch, the third switch, and the fourth switch being configured in the first state.

16. The method of claim 10, further comprising:

transmitting the first output signal to a first multiplexer; and transmitting the second output signal to a second multiplexer.

17. The method of claim 10, wherein the first optical signal has a first spectral component at a first wavelength and a second spectral component at a second wavelength, the second optical signal has a third spectral component at the first wavelength and a fourth spectral component at a fourth wavelength, and the method further comprises:

selecting the first switch into the first state to transmit the first portion of the first optical signal;

selecting the second switch into the second state to block the third portion of the second optical signal;

selecting the third switch into the second state to block the second portion of the first optical signal; and selecting the fourth switch into the first state to transmit the fourth portion of the second optical signal.

\* \* \* \* \*